UNITED STATES PATENT OFFICE.

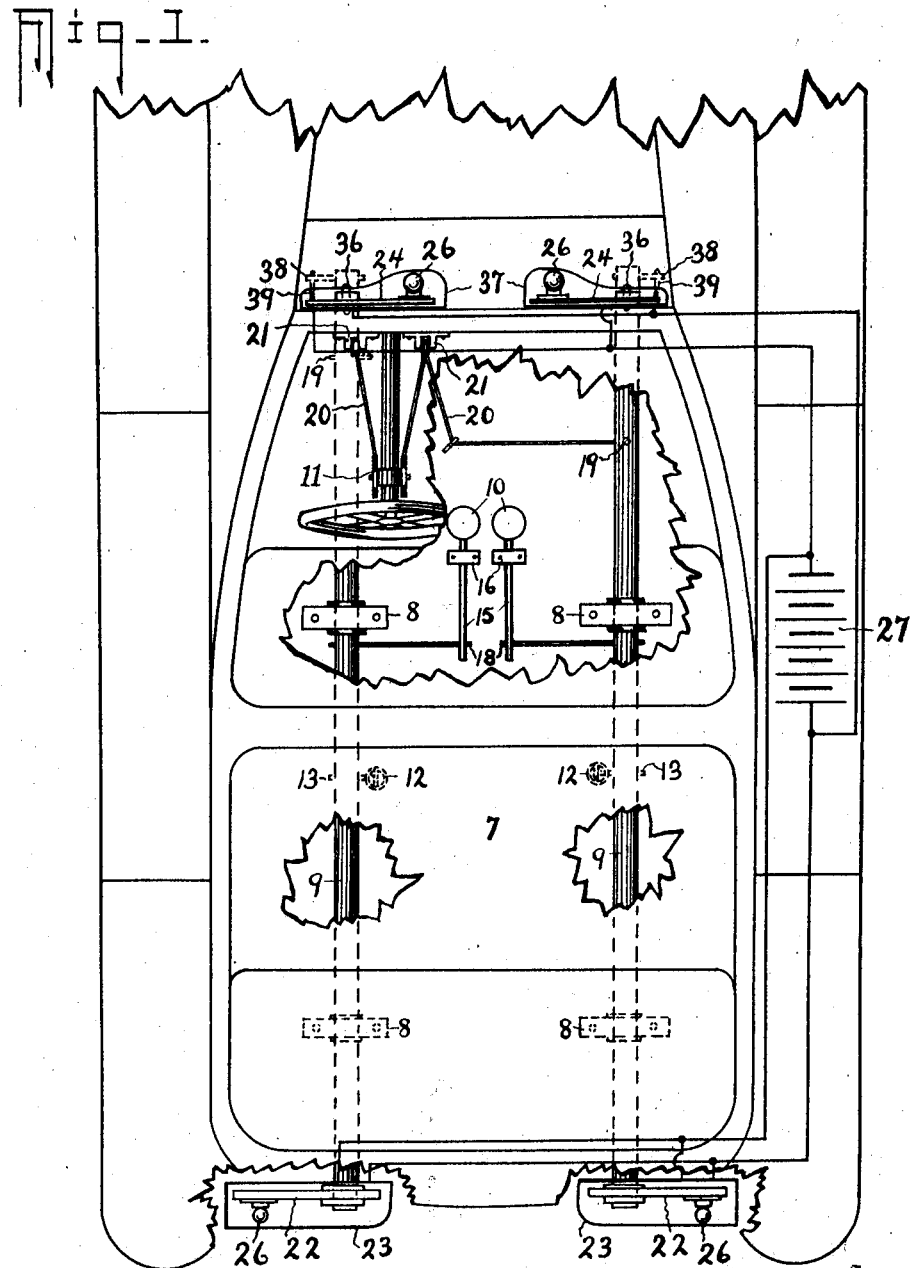

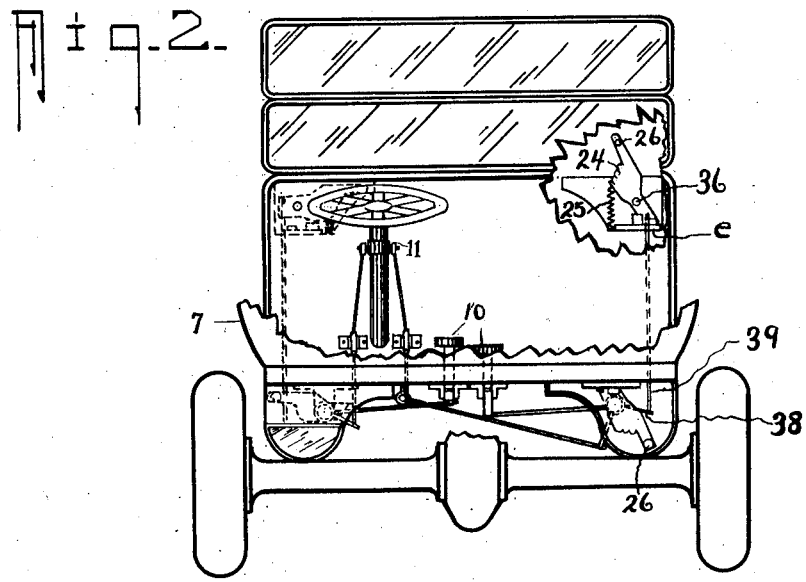
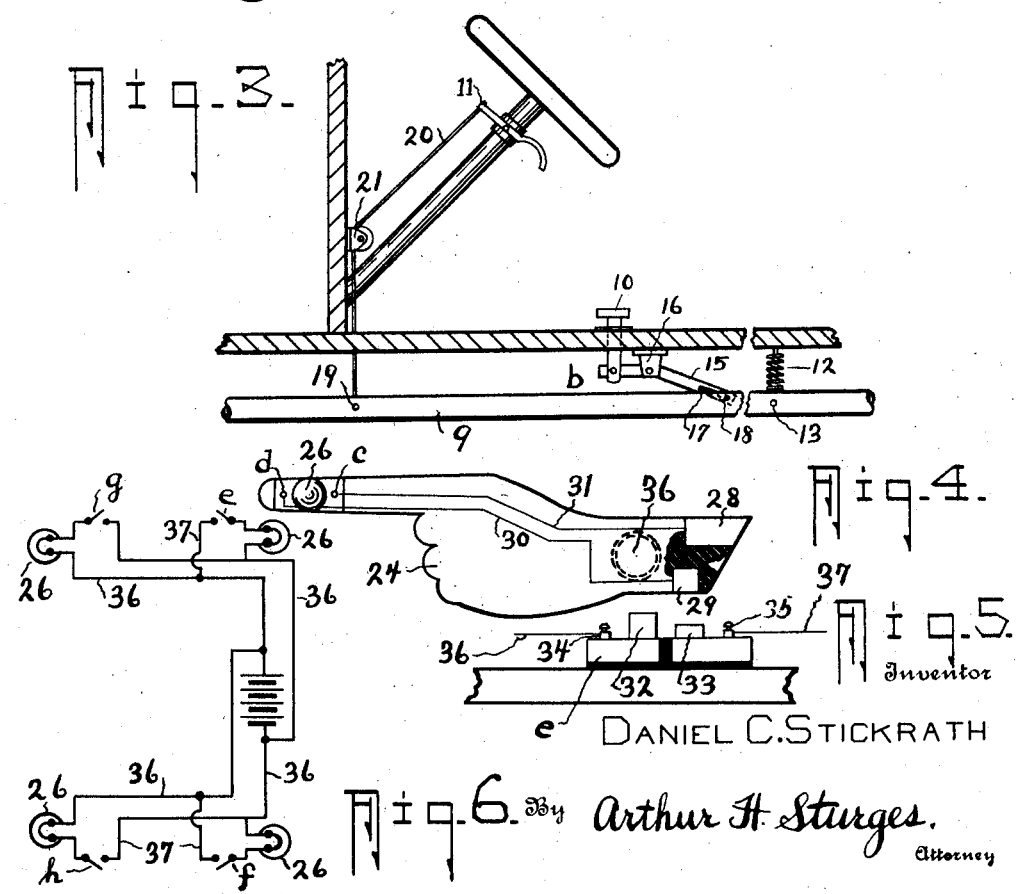

DANIEL C. STICKRATH, OF OMAHA, NEBRASKA.

DIRECTION-INDICATOR FOR VEHICLES.

1,332,236.  Specification of Letters Patent.  Patented Mar. 2, 1920.

Application filed April 16, 1918. Serial No. 228,846.

*To all whom it may concern:*

Be it known that I, DANIEL C. STICKRATH, a citizen of the United States, residing at Omaha, in the county of Douglas and State of Nebraska, have invented certain new and useful Improvements in Direction-Indicators for Vehicles, of which the following is a specification.

This invention relates to a direction indicator for vehicles, and more particularly for automobiles, and has for its principal object to provide a device for this purpose which will be convenient in use and may be economically manufactured.

Another object is to provide selective means whereby the device may be operated as occasion may require by using the hands or feet, at the choice of the operator.

A further object is to provide indices which will appear simultaneously at the front and rear of the vehicle, said indices to be visible by day and provided with means for visibility at night.

With these objects in view and others to be hereinafter mentioned, the invention presents a novel construction, combination and arrangement of parts as described herein and claimed, and as illustrated in the accompanying drawings, wherein,—

Figure 1 is a broken away plan view of an automobile with the device applied. Fig. 2 is a broken away view showing the rear of the automobile, the signals on one side being extended. Fig. 3 is a longitudinal sectional view through a part of the body of the automobile showing the steering post with parts of the device attached. Fig. 4 is a side view of an index. Fig. 5 is a side view of the electrical connections for an index. Fig. 6 illustrates an electrical circuit.

Referring now to the drawing for a more particular description, numeral 7 indicates a conventional type of automobile, below and bolted to which, are shaft hangers 8 which provide bearings for the pair of shafts 9. These shafts are adapted to rotate within their hangers when either the foot pedals 10 are depressed, or the hand levers 11 are swung by the operator, and to be returned to their normal position by means of springs 12. As best shown in Fig. 3, one end of each spring is attached to the floor board of the vehicle, its opposite end being attached to a rod 13, said rods 13 being disposed transversely of and mounted rigidly with the shafts and operating as crank arms for returning the shafts to their normal position.

According to the present arrangement, the signals, normally, are not visible, but are to be moved into view by the driver whenever required. In order that the signals may be moved by operation of the pair of foot pedals or pair of hand levers, certain devices are provided, these being of simple construction and so arranged that operation will be convenient and effective. For night service, the same signals are used and are rendered visible by suitable lights and an electrical circuit which is established only when the signals are moved, so that electrical energy may be conserved.

The pair of pedals 10 project above the floor board of the vehicle, and each pedal has its lower end pivotally connected with a bell-crank 15, the latter being mounted in brackets 16 which are suitably attached to the floor board.

The ends of the bell-cranks are provided with slots, as indicated at 17. Numerals 18 indicate a pair of transverse arms, each having a rigid connection with a shaft 9 and engaging in a slot 17 of a bell-crank.

The pair of hand levers 11 are pivotally mounted upon the steering post, opposite to each other. Numerals 20 indicate a pair of cables, each being connected at one of its ends with the end of a hand lever 11, its opposite end being connected with the end of a transversely disposed actuating-rod 19, a pair of said actuating-rods 19 being employed and each having a rigid connection with a shaft 9.

Numerals 21 indicate a pair of pulleys, each being suitably mounted on the vehicle frame and being engaged by a cable 20, and it will be understood that a driver by use of the hand levers may have a convenient control to cause a rotatable movement in one direction, of either of shafts 9, the springs 12 being depended upon for causing a rotatable movement of said shafts in an opposite direction. Also a driver, by use of the pedals, may cause a rotatable movement in one direction of either of said shafts, this obviously being of advantage since the hands of the driver may be otherwise required in the management of the vehicle.

At the rear end of each shaft 9 and rigidly mounted thereon is an index or signal 22 disposed within a housing receptacle 23 which protects it from accumulations of dust and normally conceals it from view, each housing 23 being provided with a transparent part, as clearly shown in the drawing, to permit the index to be seen after it has been swung in one direction by actuation of a shaft 9.

Numerals 24 indicate a pair of indices for the front part of the vehicle, each being disposed within a housing receptacle 37 which normally conceals it from view, each index 24 being adapted to have swinging movements from a pivot 36 suitably mounted upon a part of the vehicle frame near the windshield. These indices are under control of an operator, who, as may be required, may cause either of them to have a swinging movement in one direction, transversely of the vehicle, by use of a hand lever 11 or by pressing one of the foot pedals 10, the front end of each shaft 9 being provided with a crank-arm 38, and a pair of cables 39 being provided, each being connected at one of its ends with a crank-arm 38, its opposite end being connected with an index 24, whereby a rotatable movement of a shaft 9 in one direction will cause a swinging movement of an index 24 in a corresponding direction, springs 25, as best shown in Fig. 2, being depended upon for causing a return movement of the indices 24 to their normal position.

As thus described a complete and convenient control is provided for use during daylight. All of the indices are provided with incandescent light bulbs 26, and a suitable electrical circuit is provided, including an electrical battery 27, as best shown in Fig. 1, to permit the indices to be visible at night, and since the means are the same for automatically causing illumination of each signal 22 and 24, a description relating to the illumination of an index 24 will be sufficient. By referring to Fig. 4 it will be seen that an electric light bulb 26 is mounted upon the distal end of the index, the opposite end of said index being provided with a pair of metallic plates 28 and 29, these being suitably insulated.

The plate 28 is in electrical communication with a conductor of the bulb 26, as indicated at $c$, by means of the electrical conductor 31, and the plate 29 is in electrical communication with a conductor of said bulb, as indicated at $d$, by means of the electrical conductor 30.

Numerals 32 and 33 indicate electrical contact-plates mounted upon the insulated switch-block $e$ which has a mounting upon and stationary with the vehicle frame, and it will be understood that when the index has a swinging movement upon its pivot 36, the plates 28 and 29, moving in a direction of the switch-block $e$, said last named plates will make contact, respectively, with the plates 32 and 33, to complete an electrical circuit.

Each index therefore operates as a contact-piece for an electrical switch, and normally, the electrical circuit is broken, but will be established to cause illumination when the distal end of an index moves to a position adjacent to a transparent part of a housing, the contact-plates 28 and 29 moving into engagement with the contact-plates of the switch $e$.

In the present instance I employ four electrical switch-blocks or switches, each being the same as described, their connections with the battery being clearly shown in Fig. 6 of the drawing, and designated respectively, at $e$, $f$, $g$ and $h$, these being actuated in pairs. For instance, if a driver intends to move to the left, when moving upon a curve at a street intersection, he may press the left pedal downwardly or may use the left hand-lever, which, as above explained, will cause a limited rotatable movement of the shaft 9 at the left side of the vehicle, which will cause coincident closure of the switches $g$ and $h$ to cause coincident illumination of the two electric light bulbs 26 at the left side of the vehicle, and it will be understood that illumination of the two electric light bulbs at the right side of the vehicle will occur when the other pedal or hand-lever is actuated, since the electrical switches $e$ and $f$ will be closed.

Numerals 34 and 35 indicate binding-posts for each electrical switch-block $e$, $f$, $g$ and $h$, and numerals 36 and 37 indicate electrical conductors provided for each electrical switch, and energized by the electrical battery.

Having fully described my invention and its several uses, what I claim and desire to secure by Letters Patent is,—

1. In a direction indicator for a vehicle, a pair of pivotally mounted indicators, a pair of shafts disposed longitudinally of the vehicle each being provided with a transverse arm, mechanism on each shaft connected with an indicator, a second pair of indicators, each being rigidly mounted on a shaft, resilient means normally tending to prevent a rotatable movement of the shafts, a pair of bell cranks, each being connected with a transverse arm of a shaft, a pair of foot-pedals, one of said foot pedals being movable for moving one of said bell cranks to cause a revoluble movement of a shaft against the force of said resilient means for causing coincident swinging movements of its rigidly mounted indicator and a pivotally mounted indicator.

2. In an indicator as specified, a shaft adapted to be mounted longitudinally upon a vehicle, a lever for turning the shaft, a spring carried by the vehicle and connected to the shaft for yieldingly holding the same from turning, a bell-crank lever pivoted on the vehicle and having a longitudinal slot in one arm thereof, an arm projecting from the shaft and engaged in said slot for turning the shaft upon operation of the bell-crank lever, a signal fixed on the rear end of the shaft, a housing mounted on the vehicle for normally receiving the signal, a front signal pivotally carried by the vehicle, a housing therefor, a spring yieldingly holding the front signal in the housing, and a connection between the signal and the forward end of said shaft for simultaneously operating both of said signals when the shaft is turned.

In testimony whereof, I have affixed my signature in presence of two witnesses.

DANIEL C. STICKRATH.

Witnesses:
 ARTHUR H. STURGES,
 HIRAM A. STURGES.